United States Patent
Wang Helmersson et al.

(10) Patent No.: US 8,320,266 B2
(45) Date of Patent: Nov. 27, 2012

(54) METHOD OF CONTROLLING POWER IN A WCDMA SYSTEM

(75) Inventors: Ke Wang Helmersson, Linkoping (SE); Eva Englund, Linkoping (SE); Patrik Karlsson, Alta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 76 days.

(21) Appl. No.: 12/447,823

(22) PCT Filed: Nov. 6, 2006

(86) PCT No.: PCT/SE2006/050453
§ 371 (c)(1),
(2), (4) Date: Apr. 29, 2009

(87) PCT Pub. No.: WO2008/057016
PCT Pub. Date: May 15, 2008

(65) Prior Publication Data
US 2010/0067389 A1 Mar. 18, 2010

(51) Int. Cl.
*H04J 3/14* (2006.01)
(52) U.S. Cl. ........................................................ 370/252
(58) Field of Classification Search .................. None
See application file for complete search history.

(56) References Cited

U.S. PATENT DOCUMENTS

| 7,551,596 B2 * | 6/2009 | Kim et al. ........... 370/349 |
| 2004/0141473 A1 | 7/2004 | Buot |
| 2004/0219920 A1 * | 11/2004 | Love et al. ........... 455/442 |
| 2006/0079267 A1 * | 4/2006 | Kim et al. ........... 455/522 |
| 2006/0215608 A1 * | 9/2006 | Lee et al. ........... 370/331 |

FOREIGN PATENT DOCUMENTS

CN 1809997 7/2006

OTHER PUBLICATIONS

International Search Report and Written Opinion dated Aug. 23, 2007 (12 pages).
International Preliminary Report on Patentability dated Dec. 18, 2008 (6 pages).
First Office Action from the State Intellectual Property Office, P.R. China Corresponding to Patent Application No. 200680056297.7; Date of Issue: Jun. 9, 2011; English Translation, 8 pages.
Chinese Office Action (11 pages) corresponding to Chinese Patent Application No. 200680056297.7; Issue Date: Jul. 20, 2012.

* cited by examiner

*Primary Examiner* — Yemane Mesfin
*Assistant Examiner* — Leon Andrews
(74) *Attorney, Agent, or Firm* — Myers Bigel Sibley & Sajovec, P.A.

(57) ABSTRACT

A method and a device relating to a scheduling mechanism in a base station in a WCDMA system are disclosed. The mechanism enables the base station to rapidly adapt to users momentary traffic demands and to interference variations, a dynamical adjustable margin is proposed in this invention. The adjustment is based on the RoT measurement in a cell. To fully use the resource in a cell, the RoT can be targeted to be as closer to the $RoT_{max}$ as possible however without exceed the limit. The scheduler is preferably set to schedule as high a rate or as many users as possible to fill up the available RoT. The margin which is reserved for the neighboring cell load and external interference is decreased step by step as long as the RoT measurement is below a threshold under $RoT_{max}$. Whenever the RoT measurement exceeds the threshold, the margin is increased by one step.

13 Claims, 2 Drawing Sheets

METHOD OF CONTROLLING POWER IN A WCDMA SYSTEM

TECHNICAL FIELD

The present invention relates to a method and a device for controlling power in a radio network system, in particular a WCDMA system.

BACKGROUND

Wireless communication networks are currently in widespread use to allow mobile station users to wirelessly communicate with each other and other network entities. In one type of network, multiple stations in a particular geographic region may simultaneously communicate with a hub or base station using the same frequency band. This type of network is referred to as a self-interfering network. A code division multiple access (CDMA) network and a wideband code division multiple access (WCDMA) are both examples of self-interfering networks. Thus, the total signal power received by the base station in that frequency band may represent simultaneous transmissions from a number of the stations in the region.

For optimal network performance, especially in self-interfering networks, the transmission power of the mobile stations is carefully controlled. It can be seen that a change in transmit power by one station may affect the operation of other mobile stations, for example, requiring them to likewise change their power. In some cases, a network limit may be exceeded if a large number of mobile stations respond to one another by respectively increasing their power. This may cause the network to become unstable. To avoid this from happening, the network load may be balanced, for example, by controlling the transmission power of each mobile station to minimize its impact on other mobile stations and to accommodate for noise power in the network. The noise power is based on environmental factors, such as temperature, which change throughout the day. Thus, any technique that attempts to adjust the network load needs to account for changing noise power in the network.

One technique that is used to measure network characteristic referred to as the rise-over-thermal (RoT). The RoT is a ratio between the total power in the reverse link (Pr) and the thermal noise power (N) that is received at a receiver (i.e., base station). Thus, the rise over thermal (RoT) indicates the ratio between the total power received from wireless sources at a base station and the thermal noise.

In a WCDMA system, the shared resource in the uplink is the uplink interference. With the introduction of the enhanced uplink in WCDMA, the possibility of quickly managing the cell load is introduced by means of a fast scheduling mechanism in the base station usually termed Node B. The principle of the fast scheduling is to allow the Node B to adjust the maximum data rate a terminal is allowed to transmit with, and to reallocate the resource among users. This enables the Node B to rapidly adapt to users momentary traffic demand and interference variations. Hence, the system can be operated close to the maximum load and both user data rates and uplink capacity can be improved.

To be able to profit from the enhanced uplink scheduling function the scheduler must be provided with suitable and accurate estimates on the scheduling headroom for E-DCH. Besides the maximum load limit, the coverage limit, $RoT_{max}$ and stability limit, $L_{max\ S}$, the maximum scheduling headroom is depended on the cell load in the surrounding cells.

The load generated by the neighboring cells and external interference cannot be measured directly from the cell. To avoid over-scheduling of the resources, a margin is needed to account for the neighboring cell interference and external interference.

In a traditional WCDMA radio network where only speech and low data rate traffic are considered, the and where the load from surrounding cells is rather stable, a fixed margin has been used. However, with the introduction of the enhanced uplink in WCDMA, the interference variation becomes much larger. It is difficult to set a fixed margin when the load variation in the neighboring cells can be very large in a rather short time period. If a margin is set to be large enough to handle a worst-case scenario, the maximum scheduling headroom is small; and the scheduler in one cell cannot take advantage of moments when the neighboring cells are not fully loaded. However, the margin cannot be set smaller than the worst case scenario, since over-scheduling of the resources can result in power rushes and instability.

Hence, there is a problem of providing a mechanism for an improved way of operating WCDMA networks and to optimize network performance such that the scheduler can take advantage of moments when neighboring cells are not fully loaded.

SUMMARY

It is an object of the present invention to overcome or at least reduce some of the problems associated with having a fixed margin for the maximum scheduling headroom.

It is another object of the present invention to provide a method and device, particularly for use in a WCDMA system that frees up scheduling capacity within the network.

It is yet another object of the present invention to provide a method and device, particularly for use in a WCDMA system that enables optimized real-time scheduling capacity within the network.

These objects and other are obtain by providing a scheduling mechanism in the base station (Node B), which enables Node B to rapidly adapt to users momentary traffic demands and to interference variations, a dynamical adjustable margin is proposed in this invention. The adjustment is based on the RoT measurement in a cell. To fully use the resource in a cell, the RoT can be targeted to be as closer to the $RoT_{max}$ as possible however without exceed the limit The enhanced uplink EUL scheduler is preferably set to schedule as high a rate or as many users as possible to fill up the available RoT. The margin which is reserved for the neighboring cell load and external interference, $L_{others}$, is decreased step by step as long as the RoT measurement is below a threshold under $RoT_{max}$. Whenever the RoT measurement exceeds the threshold, the margin is increased by one step, in particular a step being significantly larger than the decreasing steps.

BRIEF DESCRIPTION OF THE DRAWINGS

The present invention will now be described in more detail by way of non-limiting examples and with reference to the accompanying drawings, in which.

DETAILED DESCRIPTION

Figure 1:
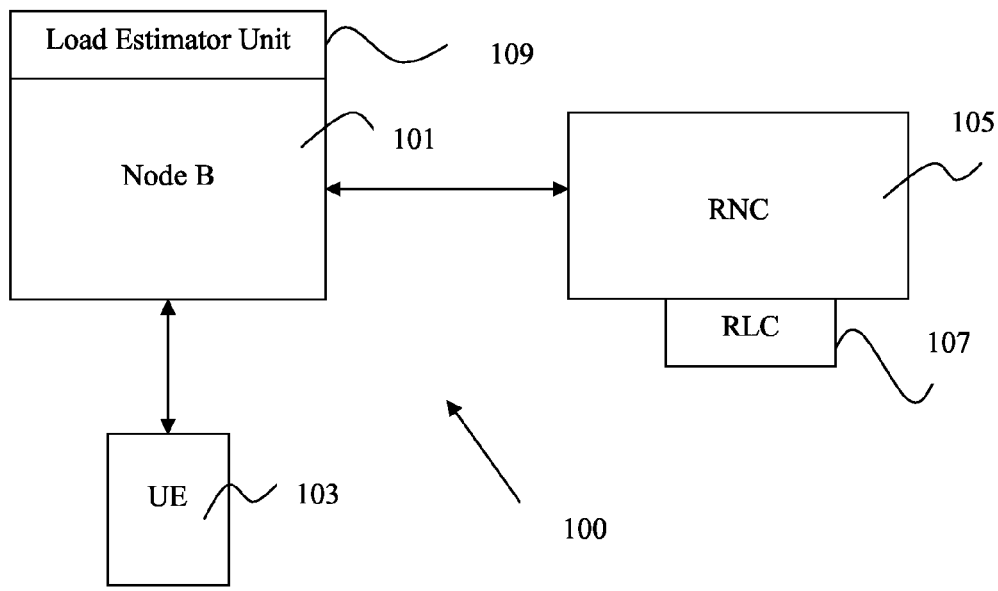
FIG. 1 is a general view of a WCDMA network.

In FIG. 1, a general view of a WCDMA system 100 is depicted. The system 100 comprises a base station (Node B)

101. The base station 101 serves a number of mobile terminals, usually termed User Equipment (UE) 103, located within the area covered by the base station 101. The base station 101 is also connected to a radio network controller node (RNC) 105. The RNC 105 typically also includes a Radio link controller node (RLC) 107. The RLC 107 is among other things responsible for detecting errors. The system 100 also comprises a load estimator and scheduler unit 109, which is co-located with or an integral part of the base station 101.

To support the fast scheduling, the rise over thermal, RoT, and C/I measurements are used to provide an estimation of uplink cell load. The RoT is calculated as the total received uplink power, RTWP, of the cell divided by the thermal noise floor power. The RTWP is the sum of WCDMA radio link power of the own cell and neighbor cells, external non-WCDMA interference and thermal noise power.

Figure 2:
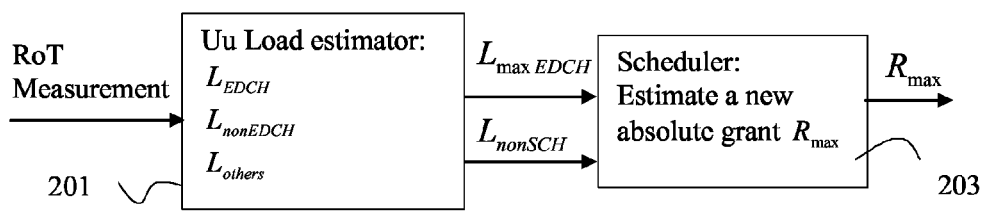
FIG. 2 is a view of a load estimator.

In FIG. 2, an overview of the load estimator 201 and interface to the scheduler 203 is depicted. The task of the load estimator is to provide the scheduler with the maximum allowed E-DCH load and the scheduling headroom.

The total cell load consists of the load caused by the E-DCH users, $L_{EDCH}$ and non-E-DCH users, $L_{nonEDCH}$, in the own cell, as well as other loads such as the load contributions from the surrounding cells and the external interference, $L_{others}$.

The enhanced uplink scheduler can only control the E-DCH data traffic. In principle, when the total cell load is low, or the RoT is low, more users or higher data rate can be scheduled on the E-DCH; when the total cell load is high, less or lower data rate can be scheduled on the E-DCH. To determine the scheduling grants, $R_{max}$, the scheduler needs to know the maximum allowed E-DCH load, $L_{max\,EDCH}$, i.e. the maximum scheduling headroom. The task of the load estimator is to provide the scheduler with an estimation on the cell load that is not controlled by the scheduler, $L_{nonSCH}$, and load contributions from surrounding cells. The maximum scheduling headroom can then be calculated by:

$$L_{max\,EDCH} = L_{max} - L_{others} - L_{nonSCH}.$$

where $L_{max}$ is the maximum load limit in a cell. The maximum load limit in a cell is depended on whether a cell is coverage limited or capacity limited. Since the shared resource in the uplink is the uplink interference, the coverage is lost when the received interference, or equivalently the RoT, exceeds a certain coverage limit, denoted by $RoT_{max}$. The coverage limit depend cell size and thermal noise level. The variations in actual cell size due to changing thermal noise level are much slower than the variations in inter-cell interference of interest here. The maximum load limit in the coverage limited case can be calculated by:

$$L_{max\,RoT} = 1 - \frac{1}{RoT_{max}}.$$

In other situations, for example in small cells, the limitations due to coverage may be quite relaxed and there is a need to limit the load to guarantee power control stability. To guarantee stable operation and avoid power rushes when the cell load is close to the pole capacity, the overall load generated by the WCDMA radio links must be limited by a stability limit, $L_{max\,S}$.

By monitoring the RoT measurement and adaptively modify the margin reserved for the neighboring cell load and external interference the scheduling headroom for the E-DCH channel can be optimized. To be able to use the available headroom efficiently, the margin is in accordance with one preferred embodiment adaptively updated by a step $\Delta$, $$L_{others,new} = L_{others} \pm \Delta.$$

Also, in accordance with another preferred embodiment $L_{others}$ is decreased when the RoT is low than a threshold below $RoT_{max}$ and increased when the RoT is above the threshold.

Figure 3:
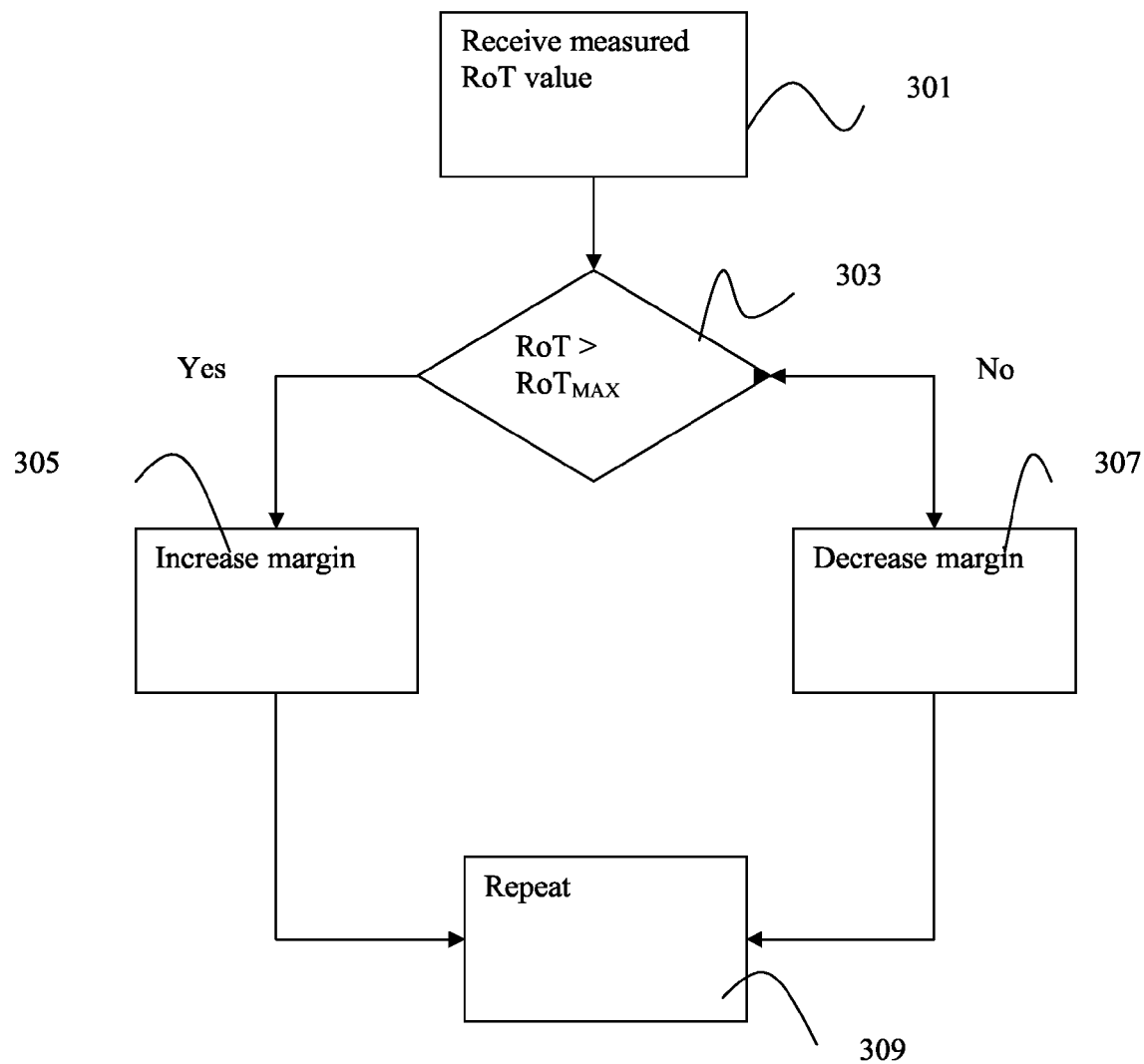
FIG. 3 is a flowchart illustrating different steps performed by a load estimator when determining maximum E-DCH load

In FIG. 3, the basic steps performed by the load estimator and scheduler are illustrated. Thus, first in a step 301 the current raise over thermal (RoT) is measured, for example, using a measuring module. Next, in a step 303, the measured RoT value is compared to the allowed maximum RoT value. If the current RoT value exceeds the allowed maximum RoT value the reservation margin reserved for neighboring cell load and external interference is increased in a step 305, and else if the current RoT value does not exceed the allowed maximum RoT value the reservation margin reserved for neighboring cell load and external interference is decreased in a step 307. The procedure is the continuously repeated as indicated by step 309.

In accordance with another aspect of the system and method as described herein the load estimation unit and scheduler also considers the delays in the RoT measurements and signaling of scheduling grants. Due to the delays in RoT measurement and signaling, the effect of changing in the margin is unknown to the load estimator until the measurement is available.

Hence, updating the margin too quickly can result in overcompensation and cause a large oscillation. To prevent such an undesired event to occur, a masking functionality is preferably employed to keep the margin from the increasing or decreasing too quickly. The masking function can for example set a masking time period, which is depended on the delays, so that the same margin is kept during the masking time period.

Since the RoT measurement only reflects prior overall cell load in, the dynamically adjusted margin serves as a reservation for the unknown situation in the surrounding cells. Thus, the step increase or decrease in margin, which in turn causes the scheduling headroom increase or decrease, is based on the old measurement. Due to this fact, the longer the delay in the measurement, the more cautious, hence the smaller step should be used in the updating of margin.

In accordance with one preferred embodiment, the step size when updating the margin is depended on the measurement delay; if the delay is larger, the step is set smaller. With a smaller step adjustment in the margin, the scheduling headroom provided by the load estimator is also less sensitive to the measurement errors and uncertainty in the load estimation.

Furthermore, since a step decrease or increase in the margin will result in a step increase or decrease in the scheduling headroom for the E-DCH, it is preferred to check that the resources are properly used. That is, to ensure that the step decrease or step increase is necessary, the updating in the margin is preferably set to check the utilization of the resources, so that the margin is decreased only if there are users in the cell that can utilize the available resource freed up by the decrease in margin.

Using the method and system as described herein provides a radio network where the margin reserved to account the interference or load caused by users in the neighboring cells is dynamically adjusted based on the RoT measurement. This in turn enables the base station, Node B, to dynamically adjust the scheduling headroom so that the uplink resource can be utilized in an efficient manner. The system as described is able to operate close to the maximum load thereby enabling both user data rates and uplink capacity to be improved.

The invention claimed is:

1. A method of adjusting uplink scheduling headroom in a radio system network, the method comprising:
   measuring a current raise over thermal, RoT, value for a base station cell,
   setting, for the base station cell, a current required reservation margin reserved for neighboring cell load and external interference in response to the measured current RoT value for the base station cell, and
   adjusting the uplink scheduling headroom for the base station cell by increasing the reservation margin reserved for neighboring cell load and external interference when the measured current RoT value is greater than an allowed maximum RoT value and decreasing the reservation margin reserved for neighboring cell load and external interference when the measured current RoT value is less than the allowed maximum RoT value.

2. The method according to claim 1, where a masking time period is employed to account for signaling delays in the radio system network, wherein after adjusting the uplink scheduling headroom for the base station cell, the reservation margin is maintained for at least the masking time period before allowing a subsequent increasing or decreasing thereof.

3. The method according to claim 1, where a step size for increasing or decreasing the reservation margin is dependent on the delay in the measurement.

4. The method according to claim 1, where a check is performed so that the reservation margin is decreased only when there is a need for more available resources.

5. A device for adjusting an uplink scheduling headroom in a radio system network, the device comprising:
   a load estimator configured to calculate for the base station cell a current required reservation margin reserved for neighboring cell load and external interference in response to a measured current raise over thermal, RoT, value for the base station cell to increase the reservation margin reserved for neighboring cell load and external interference when the measured current RoT value is greater than an allowed maximum RoT value and to decrease the reservation margin reserved for neighboring cell load and external interference when the measured current RoT value is less than the allowed maximum RoT value, and
   a scheduler configured to adjust the uplink scheduling headroom in accordance with the reservation margin for the base station cell.

6. The device according to claim 5, wherein the scheduler is further configured to set a masking time period to account for signaling delays in the radio system network, wherein after adjusting the uplink scheduling headroom for the base station cell, the reservation margin is maintained for at least the masking time period before allowing a subsequent increasing or decreasing thereof.

7. The device according to claim 5, where the load estimator is configured to set a step size for increasing or decreasing the reservation margin in response to a delay in the measurement.

8. The device according to claim 5, further comprising:
   a check unit to determine if there is a need for additional available resources, wherein the load estimator is configured to reduce the reservation margin only when there is a need for more available resources.

9. A base station in a WCDMA system comprising:
   a device comprising:
      a load estimator configured to calculate for the base station cell a current required reservation margin reserved for neighboring cell load and external interference in response to a measured current raise over thermal, RoT, value for the base station cell to increase the reservation margin reserved for neighboring cell load and external interference when the measured current RoT value is greater than an allowed maximum RoT value and to decrease the reservation margin reserved for neighboring cell load and external interference when the measured current RoT value is less than the allowed maximum RoT value, and
      a scheduler configured to adjust the uplink scheduling headroom in accordance with the reservation margin for the base station cell.

10. The base station according to claim 9 wherein the scheduler is further configured to set a masking time period to account for signaling delays in the radio system network, wherein after adjusting the uplink scheduling headroom for the base station cell, the reservation margin is maintained for at least the masking time period before allowing a subsequent increasing or decreasing thereof.

11. The device according to claim 5 wherein the device comprises a base station in a WCDMA system.

12. The method according to claim 1 further comprising:
   generating a schedule for uplink transmissions from mobile stations to the base station cell responsive to the uplink scheduling headroom for the base station cell; and
   receiving uplink transmissions from the mobile stations at the base station cell according to the schedule.

13. The method according to claim 1 further comprising:
   generating a schedule for E-DCH uplink transmissions from mobile stations to the base station cell responsive to the uplink scheduling headroom for the base station cell; and
   receiving E-DCH uplink transmissions from the mobile stations at the base station cell according to the schedule.

* * * * *

UNITED STATES PATENT AND TRADEMARK OFFICE
CERTIFICATE OF CORRECTION

PATENT NO. : 8,320,266 B2
APPLICATION NO. : 12/447823
DATED : November 27, 2012
INVENTOR(S) : Wang Helmersson et al.

It is certified that error appears in the above-identified patent and that said Letters Patent is hereby corrected as shown below:

On the Face Page, in Field (75), under "Inventors", in Column 1, Line 1, delete "Linkoping" and insert -- Linköping --, therefor.

On the Face Page, in Field (75), under "Inventors", in Column 1, Line 2, delete "Linkoping" and insert -- Linköping --, therefor.

On the Face Page, in Field (75), under "Inventors", in Column 1, Line 3, delete "Alta" and insert -- Älta --, therefor.

In Column 2, Line 44, delete "limit The" and insert -- limit. The --, therefor.

Signed and Sealed this
Twelfth Day of February, 2013

Teresa Stanek Rea
*Acting Director of the United States Patent and Trademark Office*